(12) United States Patent
Stojanovic et al.

(10) Patent No.: US 11,814,566 B2
(45) Date of Patent: Nov. 14, 2023

(54) THERMALLY CONDUCTIVE NANOMATERIALS IN FLEXIBLE FOAM

(71) Applicant: L&P Property Management Company, South Gate, CA (US)

(72) Inventors: Heidi Stojanovic, Fort Smith, AR (US); Tiffany Gramlich, Fort Smith, AR (US)

(73) Assignee: L&P Property Management Company, South Gate, CA (US)

( * ) Notice: Subject to any disclaimer, the term of this patent is extended or adjusted under 35 U.S.C. 154(b) by 687 days.

(21) Appl. No.: 16/927,119

(22) Filed: Jul. 13, 2020

(65) Prior Publication Data

US 2022/0010187 A1    Jan. 13, 2022

(51) Int. Cl.
*C09K 5/14* (2006.01)
*C08J 9/04* (2006.01)
(Continued)

(52) U.S. Cl.
CPC ............... *C09K 5/14* (2013.01); *C08J 9/008* (2013.01); *C08J 9/0076* (2013.01); *C08J 9/04* (2013.01);
(Continued)

(58) Field of Classification Search
CPC .......... C09K 5/14; C08K 3/041; C08K 3/042; C08K 2201/001; C08K 2201/004;
(Continued)

(56) References Cited

U.S. PATENT DOCUMENTS

| 2,343,581 A | 3/1944 | Reeves |
| 3,090,094 A | 5/1963 | Schwartzwalder et al. |

(Continued)

FOREIGN PATENT DOCUMENTS

| JP | 2016092193 A | * | 5/2016 | ............ B32B 29/02 |
| KR | 1020040041255 | | 5/2004 | |

(Continued)

OTHER PUBLICATIONS

Machine translation of JP 2016092193 A to Sasaki et al., published May 23, 2016 (Year: 2016).*

(Continued)

*Primary Examiner* — Jane L Stanley
(74) *Attorney, Agent, or Firm* — Wood Herron & Evans LLP

(57) ABSTRACT

A flexible cellular foam or composition contains a flexible foam structure that comprises a plurality of highly thermally conductive solids including nanomaterials. The thermally conductive solids may be carbon nanomaterials or other metallic or non-metallic solids. The carbon nanomaterials may include, but are not necessarily limited to, carbon nanotubes and graphite nanoplatelets. The highly thermally conductive solids may include but are not limited to micro-sized solids that may include graphite flakes, for example. When mixed within flexible foam, the presence of nanomaterials may impart greater support factor, greater thermal conductivity, and/or a combination of these improvements. The flexible foam composition may be polyurethane foam, latex foam, polyether polyurethane foam, viscoelastic foam, high resilient foam, polyester polyurethane foam, foamed polyethylene, foamed polypropylene, expanded polystyrene, foamed silicone, melamine foam, among others.

31 Claims, 8 Drawing Sheets

(51) Int. Cl.
*C08J 9/00* (2006.01)
*C08K 3/04* (2006.01)

(52) U.S. Cl.
CPC ............ *C08K 3/041* (2017.05); *C08K 3/042* (2017.05); *C08J 2205/05* (2013.01); *C08J 2205/052* (2013.01); *C08J 2205/06* (2013.01); *C08J 2375/04* (2013.01); *C08K 2201/001* (2013.01); *C08K 2201/004* (2013.01); *C08K 2201/011* (2013.01)

(58) Field of Classification Search
CPC ... C08K 2201/011; C08J 9/0076; C08J 9/008; C08J 9/04; C08J 2205/05; C08J 2205/052; C08J 2205/06; C08J 2375/04
See application file for complete search history.

(56) References Cited

U.S. PATENT DOCUMENTS

| | | |
|---|---|---|
| 3,097,930 A | 7/1963 | Holland |
| 3,150,109 A | 9/1964 | Ferrigno |
| 3,255,128 A | 6/1966 | Farkas et al. |
| 3,266,064 A | 8/1966 | Figman |
| 3,661,809 A | 5/1972 | Pitts et al. |
| 3,681,797 A | 8/1972 | Messner |
| 3,833,951 A | 9/1974 | Hurwitz |
| 3,925,266 A | 12/1975 | Fabris et al. |
| 3,931,062 A | 1/1976 | Cobbledick |
| 4,024,212 A | 5/1977 | Dore et al. |
| 4,452,920 A | 6/1984 | Joubert |
| 4,456,642 A | 6/1984 | Burgdoerfer et al. |
| 4,572,188 A | 2/1986 | Augustine et al. |
| 4,574,411 A | 3/1986 | Yagi |
| 4,756,958 A | 7/1988 | Bryant et al. |
| 4,776,356 A | 10/1988 | Jou et al. |
| 4,807,696 A | 2/1989 | Colvin et al. |
| 4,931,479 A | 6/1990 | Morgan |
| 4,992,481 A | 2/1991 | von Bonin et al. |
| 5,007,478 A | 4/1991 | Sengupta |
| 5,232,970 A | 8/1993 | Solc et al. |
| 5,262,468 A | 11/1993 | Chen |
| 5,312,847 A | 5/1994 | De Vos |
| 5,334,646 A | 8/1994 | Chen et al. |
| 5,336,708 A | 8/1994 | Chen |
| 5,362,834 A | 11/1994 | Schaepel et al. |
| 5,366,801 A | 11/1994 | Bryant et al. |
| 5,397,808 A | 3/1995 | Doerge et al. |
| 5,441,476 A | 8/1995 | Kitado et al. |
| 5,449,654 A | 9/1995 | Prin et al. |
| 5,499,460 A | 3/1996 | Bryant et al. |
| 5,508,334 A | 4/1996 | Chen |
| 5,555,579 A | 9/1996 | Wu |
| 5,568,659 A | 10/1996 | Fogel |
| 5,637,389 A | 6/1997 | Colvin et al. |
| 5,656,344 A | 8/1997 | Sawa et al. |
| 5,674,606 A | 10/1997 | Powers, Jr. |
| 5,722,482 A | 3/1998 | Buckley |
| 5,749,111 A | 5/1998 | Pearce |
| 5,760,117 A | 6/1998 | Chen |
| 5,804,297 A | 9/1998 | Colvin et al. |
| 5,851,338 A | 12/1998 | Pushaw |
| 5,884,639 A | 3/1999 | Chen |
| 5,908,871 A | 6/1999 | Frey et al. |
| 5,944,389 A | 8/1999 | Zenba et al. |
| 5,955,188 A | 9/1999 | Pushaw |
| 6,004,662 A | 12/1999 | Buckley |
| 6,025,067 A | 2/2000 | Fay |
| 6,048,810 A | 4/2000 | Baychar |
| 6,051,624 A | 4/2000 | Bastin et al. |
| 6,063,825 A | 5/2000 | Isobe et al. |
| 6,085,369 A | 7/2000 | Feher |
| 6,103,152 A | 8/2000 | Gehlsen et al. |
| 6,117,176 A | 9/2000 | Chen |
| 6,121,336 A | 9/2000 | Okoroafor et al. |
| 6,183,855 B1 | 2/2001 | Buckley |
| 6,235,801 B1 | 5/2001 | Morales et al. |
| 6,265,457 B1 | 7/2001 | Dolgopolsky et al. |
| 6,319,599 B1 | 11/2001 | Buckley |
| 6,387,973 B1 | 5/2002 | Saleh et al. |
| 6,425,527 B1 | 7/2002 | Smole |
| 6,497,720 B1 | 12/2002 | Augustine et al. |
| 6,498,198 B2 | 12/2002 | Pearce |
| 6,602,925 B1 | 8/2003 | Van Den Bosch et al. |
| 6,687,937 B2 | 2/2004 | Harker |
| 6,698,510 B2 | 3/2004 | Serra et al. |
| 6,699,266 B2 | 3/2004 | Lachenbruch et al. |
| 6,720,362 B1 | 4/2004 | Park |
| 6,765,031 B2 | 7/2004 | Salyer et al. |
| 6,772,825 B2 | 8/2004 | Lachenbruch et al. |
| 6,855,410 B2 | 2/2005 | Buckley |
| 6,855,742 B2 | 2/2005 | Hager et al. |
| 6,887,809 B1 | 5/2005 | Adler |
| 6,908,979 B2 | 6/2005 | Arendoski |
| 7,077,990 B2 | 7/2006 | Miller |
| 7,093,599 B2 | 8/2006 | Chen |
| 7,138,175 B2 | 11/2006 | Saito |
| 7,178,866 B1 | 2/2007 | Scott |
| 7,191,478 B2 | 3/2007 | Schmidt |
| 7,193,002 B2 | 3/2007 | Chen |
| 7,222,380 B2 | 5/2007 | Chen |
| 7,226,484 B2 | 6/2007 | Chen |
| 7,234,560 B2 | 6/2007 | Chen |
| 7,344,568 B2 | 3/2008 | Chen |
| 7,361,695 B2 | 4/2008 | Tu et al. |
| 7,520,012 B2 | 4/2009 | Robins |
| 7,661,164 B2 | 2/2010 | Chen |
| 7,727,267 B2 | 6/2010 | Lachenbruch |
| 7,737,192 B2 | 6/2010 | Yano |
| 7,744,991 B2 | 6/2010 | Fischer et al. |
| 7,793,372 B2 | 9/2010 | Lean et al. |
| 7,827,704 B2 | 11/2010 | Fox et al. |
| 7,930,782 B2 | 4/2011 | Chen |
| 8,070,876 B1 | 12/2011 | Jiang |
| 8,293,808 B2 | 10/2012 | Herrington et al. |
| 8,568,632 B2 | 10/2013 | Rynd et al. |
| 8,875,472 B2 | 11/2014 | Korwin-Edson et al. |
| 8,933,139 B1 | 1/2015 | Peterson et al. |
| 8,933,140 B2 | 1/2015 | Peterson et al. |
| 8,993,140 B2 | 3/2015 | Schiemann et al. |
| 9,012,522 B2 | 4/2015 | Alcazar Jorba et al. |
| 9,023,907 B2 | 5/2015 | Frei et al. |
| 9,534,098 B2 | 1/2017 | Peterson et al. |
| 10,113,043 B2 | 10/2018 | Peterson et al. |
| 10,202,499 B2 | 2/2019 | Crawford et al. |
| 10,329,469 B2 | 6/2019 | Peterson et al. |
| 10,526,518 B2 | 1/2020 | Peterson et al. |
| 11,597,862 B2 * | 3/2023 | Stojanovic ............... C09D 5/00 |
| 2001/0018466 A1 | 8/2001 | Gansen et al. |
| 2001/0056129 A1 | 12/2001 | Stender et al. |
| 2002/0031659 A1 | 3/2002 | Gansen et al. |
| 2003/0088019 A1 | 5/2003 | Pause et al. |
| 2003/0203182 A1 | 10/2003 | Thomson |
| 2003/0220432 A1 | 11/2003 | Miller et al. |
| 2004/0097608 A1 | 5/2004 | Re'em |
| 2004/0102573 A1 | 5/2004 | Stender et al. |
| 2004/0192795 A1 | 9/2004 | Chevalier et al. |
| 2004/0204511 A1 | 10/2004 | Tokuyasu et al. |
| 2004/0229986 A1 | 11/2004 | Pearce |
| 2004/0241417 A1 | 12/2004 | Fischer et al. |
| 2004/0247852 A1 | 12/2004 | Kume et al. |
| 2005/0070620 A1 | 3/2005 | Derrington et al. |
| 2005/0208286 A1 | 9/2005 | Hartmann et al. |
| 2006/0073089 A1 | 4/2006 | Ajayan et al. |
| 2006/0110998 A1 | 5/2006 | Takenishi et al. |
| 2006/0183849 A1 | 8/2006 | Liu et al. |
| 2007/0066788 A1 | 3/2007 | Hoffmann et al. |
| 2008/0142494 A1 | 6/2008 | Blake et al. |
| 2008/0193738 A1 | 8/2008 | Hensley et al. |
| 2009/0062432 A1 | 3/2009 | Doesburg et al. |
| 2009/0142551 A1 | 6/2009 | Fox et al. |
| 2009/0212454 A1 | 8/2009 | Smith et al. |
| 2009/0306237 A1 | 12/2009 | Babb et al. |
| 2010/0047550 A1 | 2/2010 | Prissok |

(56) References Cited

U.S. PATENT DOCUMENTS

| | | |
|---|---|---|
| 2010/0175810 A1 | 7/2010 | Korwin-Edson |
| 2011/0155945 A1 | 6/2011 | Soong |
| 2011/0155946 A1 | 6/2011 | Simpson |
| 2011/0196329 A1 | 8/2011 | Eckstein et al. |
| 2012/0048528 A1 | 3/2012 | Bergin et al. |
| 2012/0070606 A1 | 3/2012 | Villata |
| 2012/0149795 A1 | 6/2012 | Schleiermacher et al. |
| 2013/0079431 A1 | 3/2013 | Smiecinski |
| 2014/0039082 A1 | 2/2014 | Peterson et al. |
| 2014/0141233 A1* | 5/2014 | Crawford ............... C08K 5/01 5/636 |
| 2014/0182063 A1 | 7/2014 | Crawford et al. |
| 2014/0183403 A1 | 7/2014 | Peterson et al. |
| 2014/0260653 A1 | 9/2014 | Merrell et al. |
| 2016/0075929 A1 | 3/2016 | Biggin et al. |
| 2023/0174838 A1* | 6/2023 | Stojanovic ............. C09D 5/00 428/317.7 |

FOREIGN PATENT DOCUMENTS

| | | |
|---|---|---|
| KR | 100855053 B1 | 8/2008 |
| KR | 101228077 B1 | 1/2013 |
| WO | 2005097935 A1 | 10/2005 |
| WO | 2006038761 A1 | 4/2006 |
| WO | 2009070801 A1 | 6/2009 |
| WO | 2010129647 A1 | 11/2010 |
| WO | 2011069928 A2 | 6/2011 |
| WO | 2011081485 A2 | 7/2011 |

OTHER PUBLICATIONS

Parker, S.P., McGraw-Hill Encyclopedia of Chemistry, McGraw-Hill, New York, pp. 818-819 (1983).
Quality Foam Packaging web page, http://www.qualityfoam.com/polyester-polyurethane.asp (2014).
International Search Report in PCT/US2013/076888, dated Apr. 14, 2014.
PCT Application No. PCT/US19/37256 International Search Report dated Sep. 3, 2019.
U.S. Patent and Trademark Office; Search Report and Written Opinion in related International Patent Application No. PCT/US21/36158 dated Oct. 6, 2021; 12 pages.

* cited by examiner

THERMALLY CONDUCTIVE NANOMATERIALS IN FLEXIBLE FOAM

TECHNICAL FIELD

Typically, flexible cellular foams, such as high density polyurethane foams, have low thermal conductivities in the range of 0.02-0.04 W/(mK.) in an uncompressed state. High density polyurethane foams have a tendency to trap heat and slowly diffuse heat through conduction and convection. In particular, high density memory foam has the tendency to "sleep hotter" than traditional flexible foam, due to reduced open void space within the foam. When a person lies down on a memory foam mattress surface, the foam open void space reduces during compression and reduces the potential for air migration within the foam. As foam compression increases, convective heat transfer decreases and conductive heat transfer increases.

In previous mattress heat dissipation methods and composites designed for the same, bedding manufacturers have modified flexible cellular foam layers with various surface modifications and through-body modifications such as channeling, convoluting, and punching holes in a mattress layer in order to allow more air to pass through the foam; thereby, heat is able to dissipate faster from the mattress due to more void space. Prior methods also include forced heat dissipation methods, such as using a ventilation fan to induce cooling or a heat pump to remove heat from a bed.

Prior patents do not teach adding highly thermally conductive nanomaterials to flexible cellular foam to increase the foam thermal conductivity and using said increased thermally conductive flexible cellular foam as one or more layers in a mattress or seating article.

There remains a need for cellular foam to have improved heat dissipation.

SUMMARY

There is provided, in one non-limiting form, composites and methods of forming a composite, with highly thermally conductive nanomaterials (HTCN), the composite being comprised of a flexible cellular foam, which in some examples includes polyurethane foam and/or polyester foam, which may be open, closed, or partially open-celled in nature, and a plurality of highly thermally conductive nanomaterials, and the foams so made, wherein said composite is used in bedding and seating articles. Exemplary ranges of thermal conductivity of the nanomaterials used to make these composites may extend between 5 W/mK and 10,000 W/mK and between 10 W/mK and 7000 W/mK, inclusively in another embodiment. Other performance modifying additives may optionally be incorporated into the foam. As used herein, the phrase "weight after gas loss" refers to the weight of the composite excluding gas formed as a result of the foaming reactions or volatilization of auxiliary blowing agents during manufacturing. HTCN particles may be added or present in an amount between about 0.0001% and about 30.0%, inclusively, by weight based on the composite weight after gas loss. More preferably, HTCN particles may be added or present in an amount between about 0.0005% and about 15.0%, inclusively, by weight based on the composite weight after gas loss. Yet more preferably, the HTCN particles may be added or present in an amount between about 0.005% and about 5.0%, inclusively, by weight based on the composite weight after gas loss. In an embodiment, the highly thermally-conductive nanomaterials are added or present in an amount between 1 parts per million and 100 parts per million, inclusively, of the composite. HTCN are comprised of, but not limited to, carbon nanomaterials, single-walled carbon nanotubes, double-walled carbon nanotubes, multi-walled carbon nanotubes, graphite nanoplatelets, graphene nanoplatelets, graphite oxide, graphene oxide, diamond nanoparticles, carbonado ("Black Diamond") nanoparticles, carbon nanodots, carbon nanofibers, carbon nanotips, carbon nanowhiskers, and mixtures of two or more of these nanomaterials. In an embodiment, the HTCN particles comprise metallic nanoparticles. In an embodiment, the HTCN particles exclude silver and copper. In an embodiment, the highly thermally-conductive nanomaterials are added or present in an amount between at least 1 parts per million and 100 parts per million, inclusively, of the composite.

In some embodiments, highly thermally-conductive materials included in the HTCN are comprised of, but not limited to, materials selected from the group consisting of natural flake graphite, powder graphite, graphene, synthetic graphite, graphite-based particulates, aluminum nitride, diamond, diamond crystal powder, natural diamond crystal powder, type IIa diamond powder, carbanado ("Black Diamond") nanoparticles, silicon carbide, boron nitride, tungsten carbide, metal flakes, and combinations thereof. In some embodiments, the metal flakes are selected from a group consisting of aluminum, palladium, tungsten, silver, gold, titanium, and copper, and other materials with thermal conductivities between about 5 W/(mK) and about 10,000 W/(mK), inclusively, in solid form; alternatively, between about 10 W/(mK) and 7000 W/(mK), inclusively.

HTCN is added to the raw materials, in some examples polyurethane, prior to reaction with an isocyanate resulting in a uniformly-dispersed solid within the flexible cellular foam. Alternatively, or in addition, highly thermally conductive solids (HTCS), or particles that may exhibit an average particle size of 1.5 to 1000 micrometers, such as exfoliated graphite, may be added in the same way. Optionally, the flexible cellular foam may be synthetic or natural latex foam or melamine foam. Alternatively, the HTCN could be added to the foam non-homogeneously such as in a swirled pattern, stripes, pulsed-array or other asymmetric, symmetric, random or repeating pattern.

The composite including flexible cellular foam with highly thermally-conductive nanomaterials may be cut or molded in many structures such as, but not limited to, planar layers, convoluted layers, surface modified layers, 3D textured surfaces, molded pillows, smooth molded surfaces, molded surfaces with regular or irregular patterns. Alternatively, or in addition, the composite may be modified in any way as to generate a desired physical structure. Methods of modification may include, but are not limited to, hole punching, channeling, reticulation or other method known to the art of foaming for modifying the structure of foam.

In some embodiments, the flexible cellular foam includes combinations of suitable layering substrates including, but not limited to, flexible polyurethane foam, latex foam, flexible melamine foam, and other substrates (such as fibers in woven or non-woven form) with at least one layer of flexible cellular foam with highly thermally-conductive nanomaterials. There is also provided, in a non-restrictive embodiment, an article of manufacture comprising a composite including flexible cellular foam and highly thermally-conductive nanomaterials. Articles that may be manufactured from these combinations include, but are not necessarily limited to, mattresses, mattress toppers, pillows, bedding products, pet beds, quilted mattress toppers, pillow or mattress inserts, contoured support foam, or other cushioning products.

Figure 1:
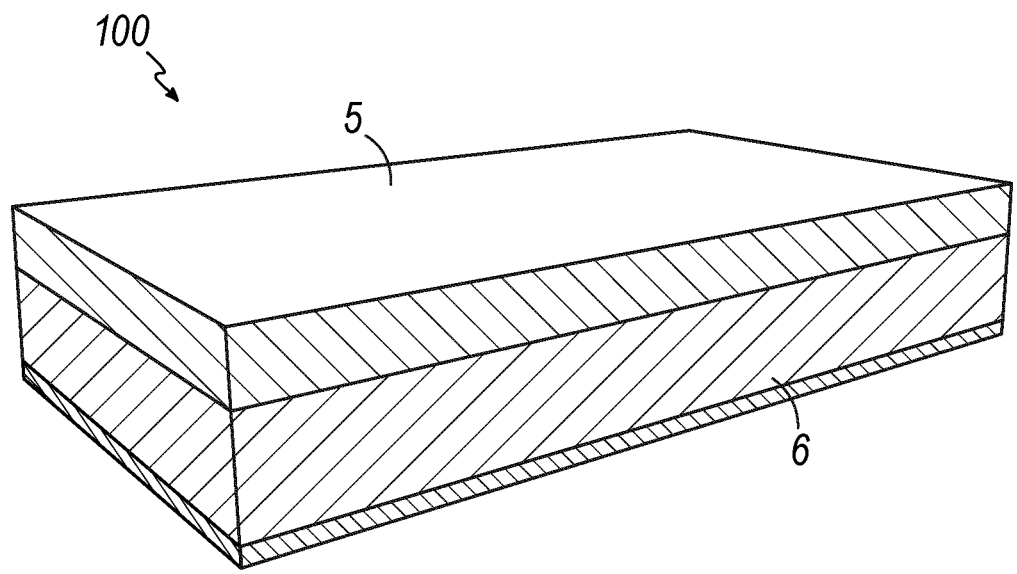
FIG. 1 is a schematic view of a support surface made with a top comfort layer typically made of high density foam, such as memory foam.

It will be appreciated that the various elements and details shown in photographic and graphic illustrations are not necessarily to scale or proportion, and that many details have been removed or simplified for clarity. Furthermore, this disclosure is not necessarily limited to the embodiments or details depicted or discussed in the Figures.

DETAILED DESCRIPTION

As used herein, "nano-sized" is defined to mean that the particle length in at least one dimension is less than 1000 nanometers, most often between about 1 and about 500 nanometers. HTCN have a high thermal conductivity of up to about 10,000 W/(mK). Additional types of HTCN or HTCS particles may be added into the foam blend to complement the HTCN particles. For example, metal highly thermally conductive solids may also be used in methods and compositions described herein and may be selected from a non-limiting list of aluminum, copper, iron, steel, silver, gold, platinum, nickel, tin, chromium, vanadium, tungsten, and combinations thereof, or derivatives made from any of those materials combined with oxygen, halogens, carbon, or silicon, and any combination thereof. The metal material may be flakes, powders, crystalline arrangements, particulates, and combinations thereof.

The methods taught herein of using a highly thermally-conductive nanomaterial (HTCN) in flexible cellular foam are useful in improving heat dissipation in articles such as, but not limited to, mattresses, mattress toppers, pillows, bedding products, pet beds, quilted mattress toppers, pillow or mattress inserts, contoured support foam, or other cushioning products.

Flexible cellular foams may include, but are not limited to, open-celled polyether polyurethane foam, closed-celled polyether polyurethane foam, partially open-celled polyether polyurethane foam, open-celled polyester polyurethane foam, closed-cell polyester polyurethane foam, partially open-celled polyester polyurethane foam, latex foam, and combinations thereof.

Highly thermally-conductive nanomaterials (HTCN) are added to a flexible cellular foam polymer matrix to form a composite, and the composite is used in bedding and seating articles. Heat, such as the heat generated by a person sleeping on a mattress, in regions of the article that are warmer than other regions, dissipates to a cooler region through improved conduction and convection, as compared to other types of additives. Incorporation of HTCN in flexible cellular foam increases the thermal conductivity of the composite and allows heat to transfer at a faster rate through the composite from a warm region to a cooler region. Alternatively, the carbon-containing HTCN may be mixed in a slurry and combined in the weight percentages provided herein to form a flexible cellular foam composite. All embodiments described herein may include the highly thermally-conductive nanomaterials dispersed throughout the flexible cellular foam without chemically bonding, ionically or covalently, the highly thermally-conductive nanomaterials to the flexible cellular foam. In addition, all embodiments described herein may include highly thermally-conductive nanomaterials which do not include polymer-bonding moieties.

The highly thermally-conductive nanomaterials (HTCN) may be comprised of, but not limited to, a group of carbon-containing nanomaterials. The carbon-containing nanomaterials include a group selected from carbon nanotubes, selected from single-walled, double-walled, and multi-walled nanotubes, graphite nanoplatelets, and graphene nanoplatelets, diamond nanopowder, carbon nanodots, graphite oxide, graphene oxide, and mixtures thereof. HTCN is added or present in an amount between about 0.0001 wt % and about 30.0 wt %, inclusively, by weight based on the composite weight after gas loss. In one non-limiting embodiment, the HTCN is added in an amount between about 0.0005 wt % and about 15.0 wt %, inclusively, by weight based on the composite weight after gas loss.

The HTCN may suitably be a powder having an average particle size between about 1 nanometer and about 1000 nanometers, inclusively, alternatively, between about 1 nanometer and about 500 nanometers, inclusively. Nano-sized particles, such as crystals, powders, dots, rods, horns, fibers, wires, whiskers, stars, and ribbons, may also be used.

The flexible cellular foam with highly thermally-conductive nanomaterials may also contain useful amounts of conventionally employed additives ("property-enhancing additives") such as plasticized triblock copolymer gels, stabilizers, antioxidants, antistatic agents, antimicrobial agents, ultraviolet stabilizers, phase change materials, surface tension modifiers, solid flame retardants, liquid flame retardants, grafting polyols, compatible hydroxyl-containing chemicals, solid or liquid fillers, anti-blocking agents, colorants, reactive organic colorants or dyes, heat-responsive colorants, heat-responsive pigments, heat-responsive dyes, pH-responsive colorants, pH-responsive pigments, pH-responsive dyes, fragrances, viscosity-modifiers, thermally conductive-enhancing additives, and other polymers in minor amounts and the like to an extent not affecting or substantially decreasing the desired properties of the flexible cellular foam with highly thermally-conductive nanomaterials. In some examples, the surface tension modifiers are silicone surfactants, emulsifying agents, and/or other surfactants. In some examples, the compatible hydroxyl-containing chemicals are completely saturated or unsaturated in one or more sites. In some examples, the colorants are inorganic pigments, carbon black pigments, organic colorants or dyes, In some embodiments, the viscosity modifiers are fumed silica and clays. In some embodiments, the thermally conductive-enhancing additives are aluminum, graphite, copper, titanium, silicon carbide, diamond, and combinations thereof.

Prior to making flexible polyurethane foam, the HTCN may be blended with various liquid raw materials, which typically contain, but are not limited to, polyols, polyether glycols, polyester polyols, copolymer polyols, isocyanates, or any other polyurethane foam reactant, either in liquid, solid, or some combination thereof. The same process may be conducted for other types of foams, such as latex or melamine foams, for example.

Figure 4:
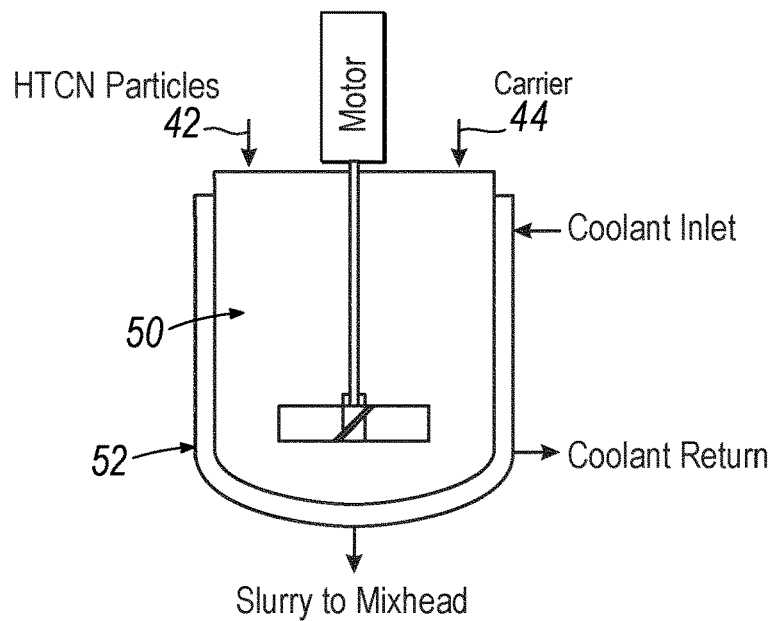
FIG. 4 is a schematic representation of an in situ process of the present invention, including one example blending system of polyol and HTCN particles, and also one example blending system such as an aqueous-based latex foam process.

Referring to FIG. 4, a method of making a composite according to the invention is described. In one non-limiting embodiment of adding HTCN particles 42 to a compatible carrier 44 is by adding the HTCN particles 42 into the compatible carrier 44 in a mix tank 50. A typical mix tank 50 may have a heating/cooling jacket 52 for controlling the temperature within the tank 50. The compatible carrier 44 is added to the mixing tank 50 and then the HTCN particles 42 are mixed into the carrier 44 while agitating the carrier 44. In some embodiments the HTCN particles 42 or the carrier 44 may be agitated during manufacturing or added in a pulsating way of the composite to form a particularly desired pattern within the flexible cellular foam such as a swirl pattern, stripes, pulsed-array, asymmetric, symmetric, random or repeating pattern of HTCN particles 42 within the final composite. While mixing, the HTCN particles 42 may be added to the tank 50 gradually or all at once. Alternatively, the HTCN particles 42 may be added to the mixing tank 50 first and then the compatible carrier 44 added to the tank 50 while mixing. Another non-limiting method of adding HTCN particles 42 to the compatible carrier 44 is by transferring the HTCN particles into a mix chamber using an auger, where the HTCN particles 42 and compatible carrier 44 are mixed prior to adding other chemicals required to make polyurethane foam. Alternatively, mixing may be performed directly into the main mix head or can be mixed in a separate mix head where the HTCN particles 42 and compatible carrier 44 mixture are fed into the main mix head with the other formulation components. Another non-restrictive method may be to use the auger to mix the HTCN particles 42 and compatible carrier 44 together while transferring to the main mix head.

In one non-limiting form, HTCN particles 42 may be added to a polyol liquid. The polyol liquid is an example of the compatible carrier 44. After adequate mixing and dispersion, the polyol/HTCN blend may be mixed with isocyanate along with one or more of the following, non-limiting examples: water, auxiliary blowing agent, silicone surfactant, gelation catalyst such as stannous octoate or dibutyltin dilaurate, or blowing catalyst such as triethylene diamine. The mixture flows on a moving conveyor or into a mold, and flexible cellular foam is produced which incorporates, encapsulates, or binds the HTCN particles 42 in the foam matrix.

Alternatively, HTCN particles 42 may be mixed in a minor polyurethane additive stream, such as silicone surfactant, and added directly to the mix-head or manifold. The minor polyurethane additive stream is another example of the compatible carrier 44. The mixture flows on a moving conveyor or into a mold, and a flexible polyurethane foam is produced which incorporates the HTCN particles 42. In one exemplary embodiment, the HTCN particles 42 are substantially uniformly mixed to result in a substantially homogeneous solid solution of the HTCN particles 42 within the carrier 44, to thereby result in a substantially homogeneous solid solution within the foam product, once the respective type of foam is completely formed.

The flexible cellular foam with highly thermally-conductive nanomaterials may be poured in a standard bun form on a conveyor, poured in a mold having planar or non-planar surfaces, textured with 2D and 3D modification, or poured in a mold with rods to make the foam perforated.

It will be appreciated that the method described herein is not limited to these examples, since there are many possible combinations for combining HTCN particles 42 with a compatible carrier 44 before incorporating HTCN particles into final polyurethane foam.

EXAMPLES

A two component system was obtained from Peterson Chemical Technology. The system consisted of a "B" side (PCT-54B) containing polyols, water, silicone surfactant, gelation catalyst and blowing catalyst, and the "A" side (PCT-54A) which consisted of an isocyanate compound. Comparative Example 1 is the polyurethane foam control sample that does not contain HTCN particles, and Inventive Example 1 is a polyurethane foam produced from the two-component system with addition of carbon nanomaterials such as carbon nanotubes, carbon (graphene) nanoplatelets, and combinations thereof, in accordance with the present invention, to obtain a final concentration of about 1% by weight based on the composite weight after gas loss. Comparative Example 2 contains the foam components and micro-sized thermal conductive materials, that to say, micro-sized particles are particles with a smallest dimension above 1000 nm.

Testing Methods

In the following Examples, as illustrated by the data in the following tables, the following tests have been used:

DTC, Dynamic Thermal Conductivity

DTC measures how rapidly a foam sample is able to transfer heat. In this test, pre-heated foam samples are allowed to cool under controlled temperature, air flow, and humidity conditions. The temperature inside the foam sample is measured at set intervals to monitor how rapidly the foam sample is releasing heat to reach room temperature. Based on the rate of cooling for each foam, a heat flow value in BTU/min·ft² is calculated. Testing for Dynamic Thermal Conductivity (DTC) may be conducted by companies such as Intertek using proprietary testing techniques.

Static Thermal Conductivity (STC): Tested According to ASTM Test E1225

This is a standard test method for thermal conductivity of solids using the guarded-comparative-longitudinal heat flow technique. This test describes a steady state technique for the determination of the bulk thermal conductivity of a material, or the ability of it to transfer heat. The thermal conductivity is measured under 75% compression and the result is expressed in BTU/(hr·ft·° F.)

Indentation Force Deflection (IFD): Tested according to ASTM D 3574-11 Test Bi.

This is a measure of the firmness of the foam, typically tested at 25 and 65% compression. The ratio of 65% IFD and the 25% IFD is defined as the support factor in ASTM D 3574-11 Appendix X3.

Table 1 tabulates the physical properties of foam Comparative Examples 1 and 2, as compared to an Inventive Example 1, all formed in accordance with general methods of making polyurethane flexible cell foam.

with a 75% compression on the foam example. As shown in Table 1, and with regard to Comparative Example 1 and Inventive Example 1, the integration of nano-particles results in significant improvements in IFD (31.6% increase) showing a marked improvement in firmness, and significant improvements in thermal conductivity (44% increase) showing a marked improvement in heat transfer. As shown in Table 1, and with regard to Comparative Example 2 and Inventive Sample 1, the integration of nano-particles results in significant improvements as compared to the microparticles in Comparative Example 2, including with regard to the IFD (31.6% increase) again showing a marked improvement in firmness, and significant improvements in thermal conductivity (30.1% increase) again showing a marked improvement in heat transfer.

As also shown in Table 1, the surface area of the thermally conductive carbon nanoparticles used integrated in Inventive Example 1 is 30.5 times as great as the surface area of an equivalent weight percent of the thermally conductive microparticles of Comparative Example 2. In sum, the results show substantial improvement in thermal conductivity and firmness by incorporating carbon nanomaterials in the polyurethane foam components before reacting into a flexible polyurethane foam. Yet further, the maximized surface area of the thermally conductive nanoparticles

TABLE 1

| Component | Units | Comp. Ex. 1 | Comp. Ex. 2 | Inventive Ex. 1 |
|---|---|---|---|---|
| FOAM EXAMPLES | | | | |
| PCT-54B Side | Parts by weight | 103.1 | 103.1 | 103.1 |
| PCT-54A Side | Parts by weight | 44.2 | 44.2 | 44.2 |
| Conductive Solid Nano | Parts by weight | 0.0 | 0.0 | 1.0 |
| Conductive Solid Micro | Parts by weight | 0.0 | 1.0 | 0.0 |
| Conductive Solid Surface Area | m²/g | 0 | 2 | 300 |
| Total Parts | Parts by weight | 147.4 | 148.4 | 148.4 |
| Gas Loss | Parts by weight | 4.9 | 4.9 | 4.9 |
| Net Parts | Parts by weight | 142.5 | 143.5 | 143.5 |
| Conductive Solid Content | % by weight based on the composite weight after gas loss | Control | 0.7% | 0.7% |
| PHYSICAL PROPERTIES | | | | |
| Density | lb/ft³(kg/m³) | 3.2(50.6) | 3.2(50.6) | 3.2(50.6) |
| IFD | lb/50 in²(N/323 cm²) | 9.5(42.1) | 9.5(42.1) | 12.5(54.7) |
| Airflow | (scfm) | 5.4 | 5.2 | 5.2 |
| Thermal Conductivity | BTU/(min · ft²) | 12.3 | 13.6 | 17.7 |

Comparative Example 1 contains foam components PCT-54B and PCT-54A, but does not contain any micro or nano thermal conductive materials. Comparative Example 2 contains the foam components and micro-sized thermal conductive materials. Inventive Example 1 contains the foam components and nano-sized thermal conductive materials, in accordance with the present invention. The density, indentation force deflection (IFD), and air-flow values were measured according to ASTM D3574. The thermal conductivity was measured according to ASTM E1225 test method results in the aforementioned advantages. It is therefore yet another objective of the present invention to provide an in situ foam manufacturing process integrating the nanomaterials of the present invention, and also, a product of that process that contains the nanoparticles dispersed therein, and more preferably, that contains the carbon nanoparticles dispersed therein. As appears in Table 2, or elsewhere herein, the term "Visco" means viscoelastic foam, otherwise known as memory foam.

TABLE 2

STATIC THERMAL CONDUCTIVITY - E1225

| Additive Description | Substrate | Additive Content (wt %) | Test Method | Static Thermal Conductivity (TC) (BTU/hr · ft · °F.) | Percent Improvement (compared to control) | Notes |
|---|---|---|---|---|---|---|
| Control | Visco | 0 | ASTM E1225-09 | 0.0240 | 0% | Nano particles at much lower wt %, show greatly improved thermal conductivity compared to graphite. |
| Graphite | Visco | 2.1 | ASTM E1225-09 | 0.0297 | 24% | |
| Graphite | Visco | 10.5 | ASTM E1225-09 | 0.0374 | 56% | |
| Carbon Nanoplatelets | Visco | 0.7 | ASTM E1225-09 | 0.0259 | 8% | |
| Carbon Nanoplatelets | Visco | 2.1 | ASTM E1225-09 | 0.0426 | 78% | |

Visco polyurethane foams were produced as described above. As shown in Table 2, the addition of graphite or carbon nanoplatelets to the exemplary foam provides a marked improvement over foams not containing any thermal conductive additive or material. Yet further, Table 2 also indicates that the addition of carbon nanoplatelets provides substantially better heat transfer or thermal conductivity as compared to graphite highly thermally conductive solids (HTCS) or particles that may exhibit an average particle size of 1.5 to 1000 micrometers; an exemplary particle may be 300 micrometers. Notably, the carbon nanoplatelets, and more generally, the non-metallic highly thermally conductive nanoparticles are provided at substantially lower weight percents than graphite or other exemplary micro-sized particles. It is believed that the substantially greater aggregate surface area of the carbon nanoplatelets (and other nanoparticles with geometries having relatively larger surface areas per particle), as compared to graphite/graphene or other thermally conductive materials, results in the advantages reported. See Table 1.

TABLE 3

SUPPORT FACTOR ASTM 3574

| Additive Description | Substrate | Additive Content (wt. %) | Test Method | Support Factor (65%/25% IFD) | Percent Improvement (compared to control) | Notes |
|---|---|---|---|---|---|---|
| Control | Visco | 0 | ASTM 3574 Test B | 2.05 | 0% | Nano particles at the same wt % of the foam, show greatly improved support as compared to other thermally conductive additives. |
| Graphite | Visco | 0.7 | ASTM 3574 Test B | 2.16 | 5% | Micro-sized particles |
| Carbon Fiber | Visco | 0.7 | ASTM 3574 Test B | 2.15 | 5% | |
| Carbon Nanotubes | Visco | 0.7 | ASTM 3574 Test B | 2.39 | 17% | |

As shown in Table 3, nanoparticles having a relatively greater and optimized surface area defined by geometric patterns such as a nanotubes or nanoplatelets, result in substantially improved support and firmness of a foam article such as a pillow or mattress, as determined by ASTM 3574 Test B. In fact, carbon nanotubes were shown to improve upon the support provided by other exemplary nanoparticles consisting of graphite and carbon fiber by 14%, 10.6%, and 11.2%, respectively.

TABLE 4

DYNAMIC THERMAL CONDUCTIVITY PCT-1006

| Additive Description | Substrate | Additive Content (wt %) | Test Method | Dynamic Thermal Conductivity (TC) (BTU/min · ft$^2$) | Percent Improvement (compared to control) | Notes |
|---|---|---|---|---|---|---|
| Control | Visco | 0 | PCT-1006 Dynamic TC | 11.8 | 0% | |
| Graphite | Visco | 0.7 | PCT-1006 Dynamic TC | 13.6 | 16% | Micro-sized Particulates-1-1000 microns (as disclosed in U.S. Pat. No. 9,534,098) |
| Carbon Fiber | Visco | 0.7 | PCT-1006 Dynamic TC | 12.3 | 5% | |
| Carbon Nanotubes | Visco | 0.7 | PCT-1006 Dynamic TC | 15.4 | 17% | |
| Carbon Nanoplatelets | Visco | 0.7 | PCT-1006 Dynamic TC | 17.7 | 50% | |
| Control | Conventional | 0 | PCT-1006 Dynamic TC | 6.3 | 0% | |
| Graphite | Conventional | 0.4 | PCT-1006 Dynamic TC | 5.8 | −9% | Micro-sized Particulates-1-1000 microns (as disclosed in U.S. Pat. No. 9,534,098) |
| Carbon Nanotubes | Conventional | 0.4 | PCT-1006 Dynamic TC | 7.7 | 21% | |
| Carbon Nanoplatelets | Conventional | 0.4 | PCT-1006 Dynamic TC | 7.7 | 21% | |

As shown in Table 4, nanoparticles such as carbon nanotubes and carbon nanoplatelets show a marked improvement in the rate of heat transfer through both Visco and Conventional foams. As also shown, carbon nanoparticles such as carbon nanotubes and carbon nanoplatelets exhibit substantially greater rates of heat transfer as compared to other carbon-containing highly thermally conductive particles such as graphite or carbon fibers. It is believed that the substantially greater surface area per gram of HTCN, including those with a defined geometry, such as a carbon nanotube with singular or multi walls, or a carbon nanoplatelet, contributes to a greater rate of heat transfer, and as described in Table 2, and a greater ability to transfer heat.

As also indicated in the tables, in yet another aspect of the invention, highly thermally conductive solids (HTCS) of the present invention optimize the aggregate surface area of the HTCS substantially uniformly or homogeneously distributed within the foam substrate. The HTCS may include nano (HTCN) and micro-sized HTCS with the desired aggregate surface area. In one exemplary embodiment, the aggregate particle surface area is between about 3 m$^2$/g and about 7000 m$^2$/g of HTCS. In other examples, the aggregate surface area is between about 5 m$^2$/g and about 6000 m$^2$/g, about 10 m$^2$/g and about 5000 m$^2$/g, or about 50 m$^2$/g and about 5000 m$^2$/g of HTCS. In another embodiment, the HTCS present in the composite may include an aggregate surface area per gram of non-metallic solids between about 10 square meters per gram of non-metallic solids and about 6000 square meters per gram of non-metallic solids. In another embodiment, the HTCS present in the composite may include an aggregate surface area per gram of non-metallic solids between about 50 square meters per gram of non-metallic solids and about 7000 square meters per gram of non-metallic solids. In another embodiment, the HTCS present in the composite may include an aggregate surface area per gram of non-metallic solids between about 10 square meters per gram of non-metallic solids and about 8000 square meters per gram of non-metallic solids. In another embodiment, the HTCS present in the composite may include an aggregate surface area per gram of non-metallic solids between about 5 square meters per gram of non-metallic solids and about 5000 square meters per gram of non-metallic solids. Non-metallic highly thermally conductive nanoparticles include carbon nanotubes, carbon nanoplatelets, and mixtures thereof, for example. Non-metallic micro highly thermally conductive solids (HTCS) include exfoliated graphite or graphene, silicon carbide, or boron nitride, for example, that may exhibit surface areas in excess of about 10 m$^2$/g.

Applications of the Flexible Cellular Foams with Highly Thermally-Conductive Nanomaterials As mentioned above, flexible cellular foams with highly thermally-conductive nanomaterials may be manufactured and combined with substrate foams for use in a variety of bedding applications, including but not necessarily limited to, mattresses, toppers, pillows, pillow toppers, mattress toppers, quilted toppers, other bed-top products, body support foam, pet beds, outdoor bedding pads, outdoor pillows, cushions, armrests, seat-backs, foot-rests, decorative cushioning, functional support, or other cushioning materials.

Layering substrates in combination with one or more flexible cellular foams with highly thermally-conductive nanomaterials and optional property-enhancing materials described herein may find utility in a very wide variety of applications. Suitable layering substrates include, but are not limited to, flexible polyurethane foam, flexible polyester polyurethane foam, latex foam, flexible melamine foam, and other substrates (such as fibers in woven or non-woven form), and combinations thereof. More specifically, in other non-limiting embodiments, the combination of flexible cellular foam with highly thermally-conductive nanomaterials and substrate would be suitable as pillows or pillow components, including, but not necessarily limited to, pillow wraps or shells, pillow cores, pillow toppers, for the production of medical comfort pads, medical mattresses and similar comfort and support products, and residential/consumer mattresses, mattress toppers, pet beds, outdoor bedding pads, outdoor pillows, shoe insoles and inserts, sports and game cushioning, other cushioning products, and similar comfort and support products, typically produced with conventional flexible polyurethane foam or fiber or latex foam, for example. All of these uses and applications are defined herein as "bedding products" or "cushioning products."

In FIG. 1, an article 100 includes a flexible cellular foam 5 that acts as a top comfort layer of a mattress, which said comfort layer is made out of, but not limited to, memory foam, latex foam, soft polyurethane foams. The article 100 has a core support portion 6, which can also be made of, but not limited to, foam, springs or air core. The article 100 shown in FIG. 1 is an example of a conventional memory foam mattress, but the invention is not limited to such articles.

Figure 2:
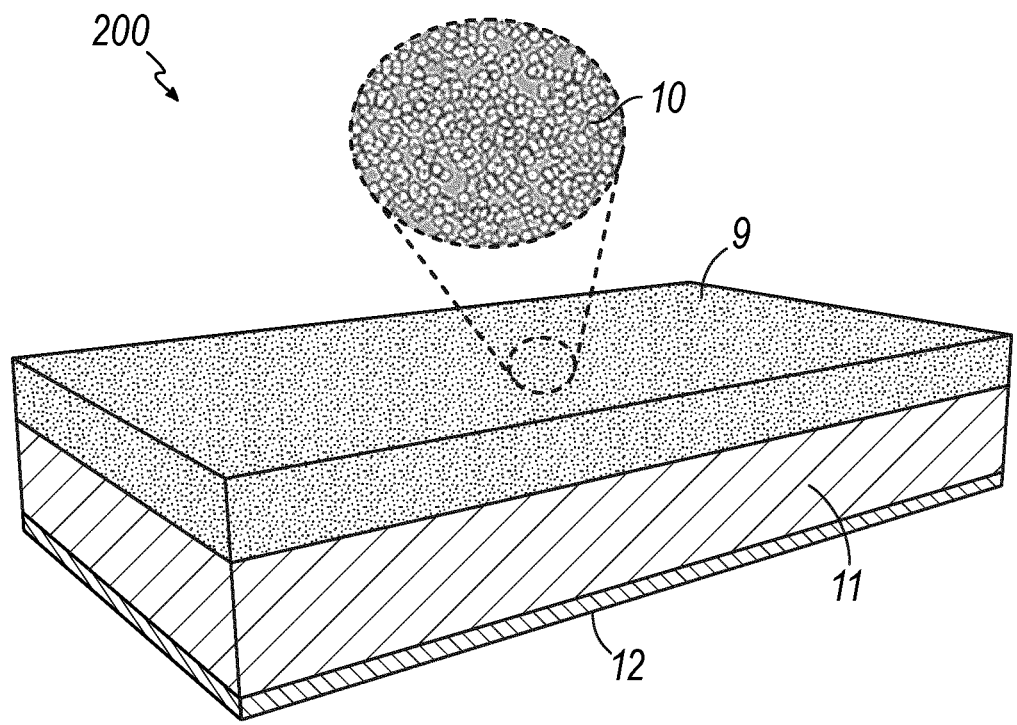
FIG. 2 is a schematic view of a support surface made with a top comfort layer which contains thermally conductive carbon nanomaterials embedded in said comfort layers at manufacture.

In FIG. 2, an article 200 includes a polyurethane foam composite 9 containing one or more HTCN materials 10 to increase the thermal conductivity of the mattress top layer; shown in more detail in the oval of FIG. 2. A support core 11 and optional firm bottom support layer 12 are used in this non-limiting embodiment.

Figure 3A:
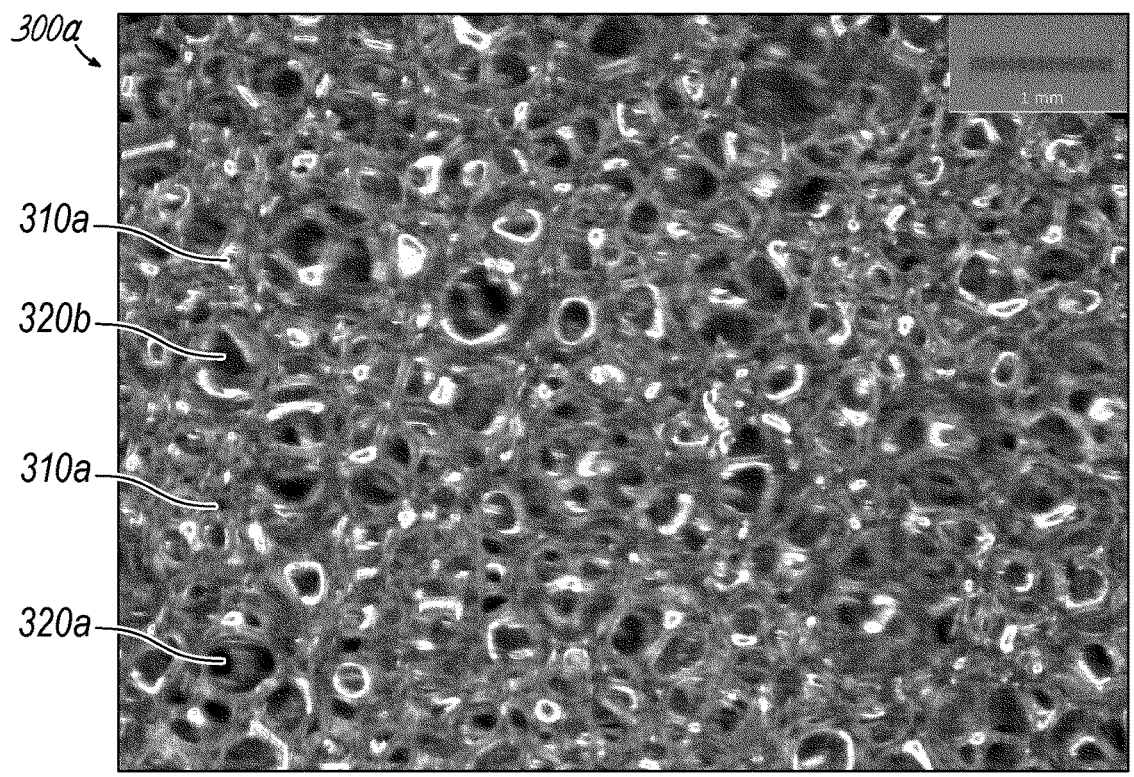
FIG. 3A is an SEM photograph of a polyurethane foam substrate containing a plurality of homogeneously dispersed thermally conductive carbon nanomaterials.

FIG. 3A illustrates a composite 300a having carbon nanoparticles 310a homogeneously distributed within the foam substrate 320a of a Visco or other polyurethane type of foam. As shown, it can be seen that the carbon nanoparticles 310a are distributed substantially coextensively across the foam substrate 320a as it is uniformly distributed during the process of making the foam substrate 320a as described in the Examples.

Figure 3B:
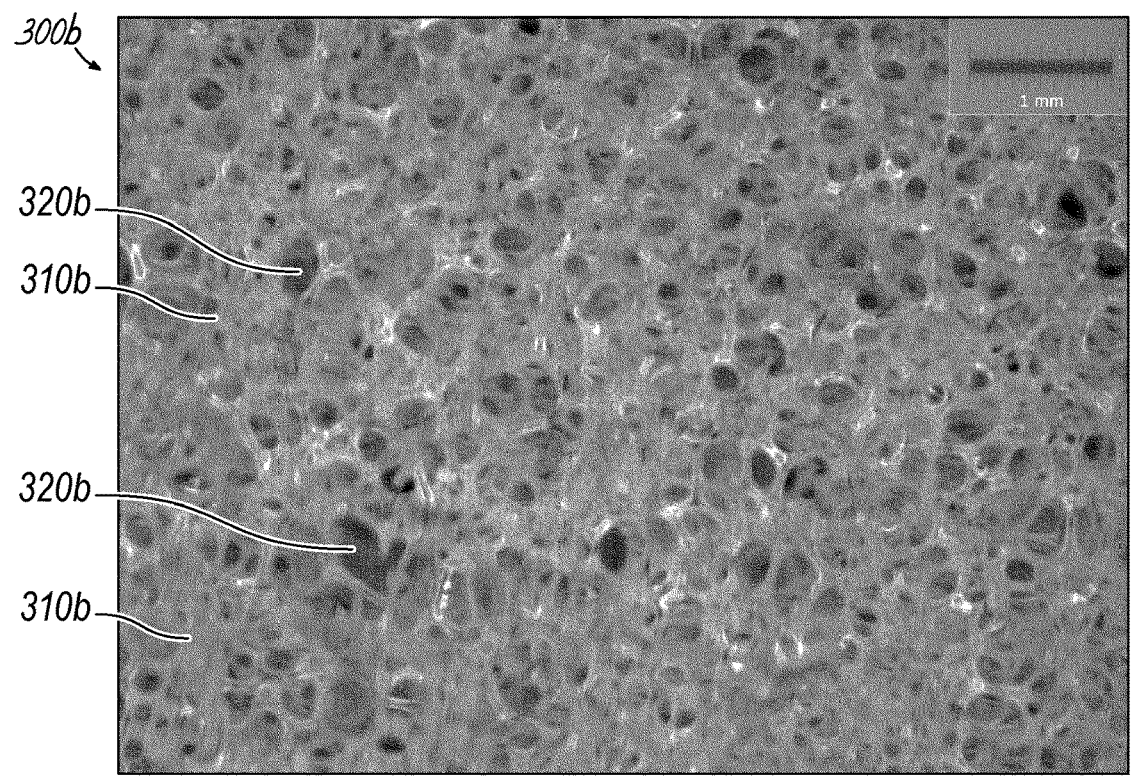
FIG. 3B is an SEM photograph of a polyurethane foam substrate containing a plurality of randomly dispersed thermally conductive carbon fibers.

FIG. 3B illustrates a composite 300b including Visco or other polyurethane foam 320b containing carbon fibers 310b. Notably, the carbon fiber 310b provided at a given weight percent is not coextensive with the foam substrate. Nor is the carbon fiber 310b seen to be as dense as the homogeneous or substantially uniform distribution of the carbon nanoparticles 310a of FIG. 3A, in accordance with the present invention, and therefore, the heat transfer within the present foam articles is substantially better with the carbon nanomaterials dispersed therein.

Figure 3C:
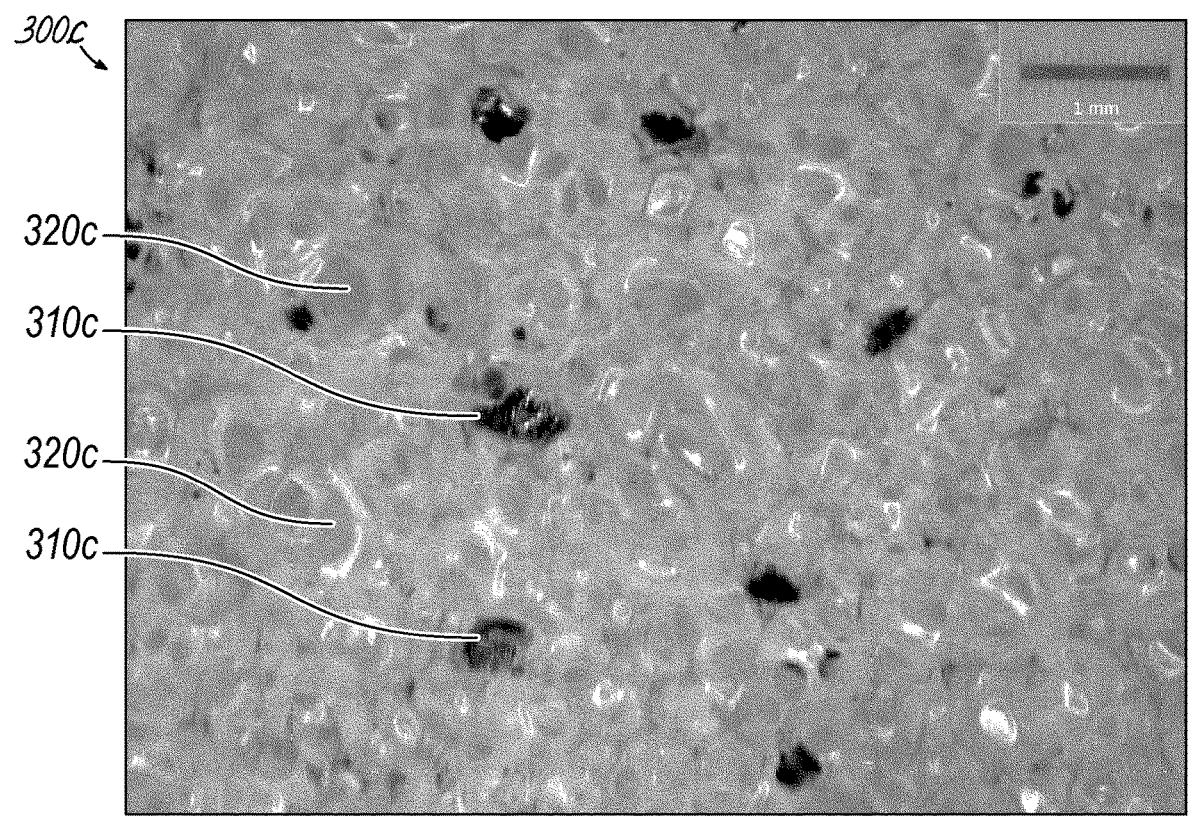
FIG. 3C is an SEM photograph of a polyurethane foam substrate containing a plurality of randomly dispersed thermally conductive graphite particles.

FIG. 3C shows a composite 300c including Visco or other polyurethane foam 320c containing a carbon nanomaterial 310c such as graphite dispersed therein. As shown throughout FIGS. 3A, 3B, and 3C, the carbon nanomaterials 310a, 310b, 310c of the present invention are homogeneously dispersed within the foam substrate 320a, 320b, 320c, provide a much more contiguous deposition of non-metallic highly thermally conductive nanoparticles (exemplary carbon nanomaterials 310a, 310b, 310c in the Figures) throughout the foam substrate 320a, 320b, 320c. It is believed that non-metallic particles such as the carbon nanomaterials 310a, 310b, 310c exhibiting the desired aggregate surface area greater than 10 m$^2$/g, also exhibit a homogeneous or substantially uniform distribution when provided within the foam during the cross-linking process, for example. As a result, the thermal conductive ability and the rate of heat transfer within a foam employing the non-metallic (e.g. carbon nanomaterials, as detailed in Tables 2 and 4, are far more effective when employing the non-metallic or carbon nanomaterials of the present invention, as compared to other known highly thermal conductive solids (HTCS). Even so, it has been discovered that other HTCS particles having an aggregate surface area greater than 10 m$^2$/g, or greater or equal to 100 m$^2$/g, when homogeneously or substantially uniformly distributed within a foam matrix, contribute to a substantially greater heat transfer within foam containing the HTCS. Exemplary micro-sized HTCS include exfoliated graphite (or graphene), silicon carbide, and boron nitride, and exemplary foam includes closed or open-celled polyurethane foam, for example.

Figure 5:
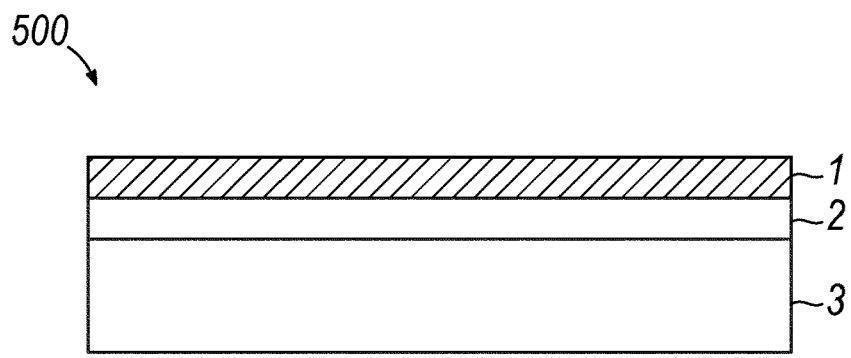
FIG. 5 is an example article such as a cushion and/or mattress implementing the composite described herein.

FIG. 5 is an example of an article 500, such as a cushion and/or a mattress. The base of the section is a prime foam layer 3. On top of this is a 2-inch (5 cm) standard, open-celled viscoelastic (visco) layer 2. The top layer 1 is a 2-inch (5 cm) layer of flexible cellular foam with highly thermally-conductive nanomaterials. It will be appreciated that the dimensions given in the examples and descriptions of the various Figures are merely illustrative and are not intended to be limiting. Throughout the drawings, the same or similar reference numerals will be used for the same or similar structures.

Figure 6:
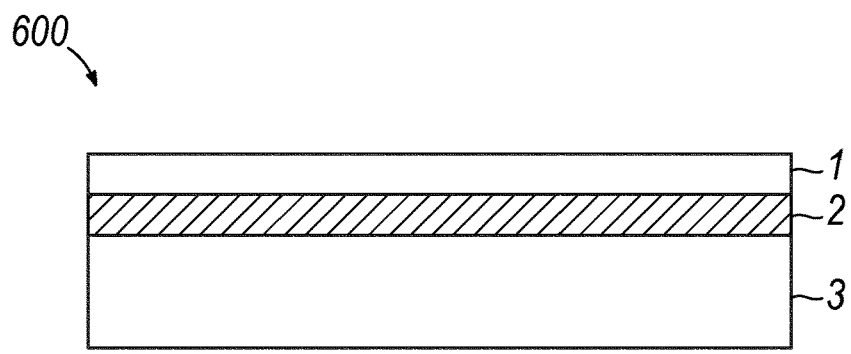
FIG. 6 is an example article such as a cushion and/or mattress implementing the composite described herein.

FIG. 6 is an example of an article 600, such as a cushion and/or mattress. The base of the section is a prime foam layer 3. On top of this is a 2-inch (5 cm) layer of flexible cellular foam with highly thermally-conductive nanomaterials 1 followed by a 2-inch (5 cm) layer 2 of standard, open-celled viscoelastic foam.

Figure 7:
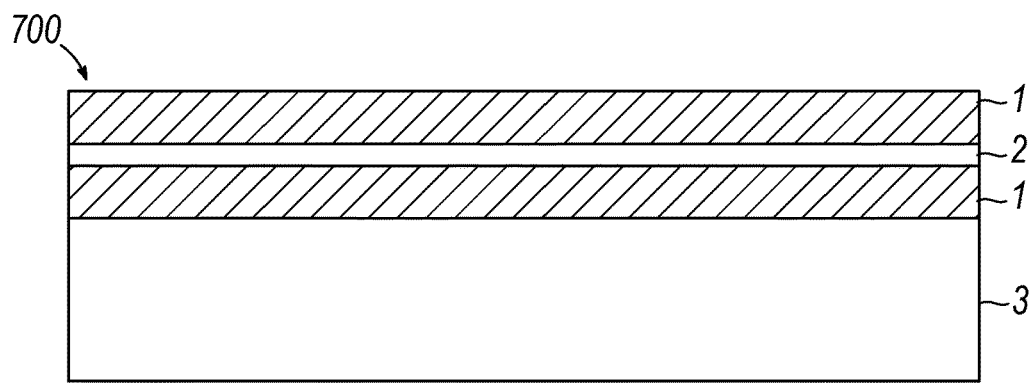
FIG. 7 is an article such as a cushion and/or mattress implementing the composite described herein.

FIG. 7 is an example of an article 700, such as a cushion and/or mattress. The base of the section is a prime foam layer 3. On top of this is a 2-inch (5 cm) layer of flexible cellular foam with highly thermally-conductive nanomaterials 1 followed by a 0.75 inch (1.9 cm) layer 3 of prime foam. The top layer is a second 2-inch (5 cm) layer of flexible cellular foam with highly thermally-conductive nanomaterials 1.

Figure 8:
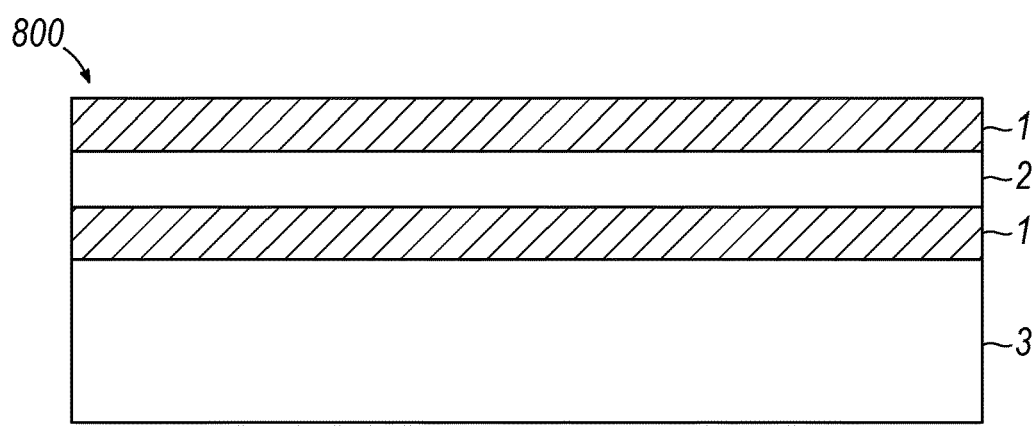
FIG. 8 is an article such as a cushion and/or mattress implementing the composite described herein.

FIG. 8 is an example of an article 800, such as a cushion and/or mattress. The base of the section is a prime foam layer 3. On top of this is a 2-inch (5 cm) layer of flexible cellular foam with highly thermally-conductive nanomaterials 1 followed by a 2-inch (5 cm) layer 2 of standard, open-celled viscoelastic foam. The top layer is a second 2-inch (5 cm) layer of flexible cellular foam with highly thermally-conductive nanomaterials 1.

Figure 9:
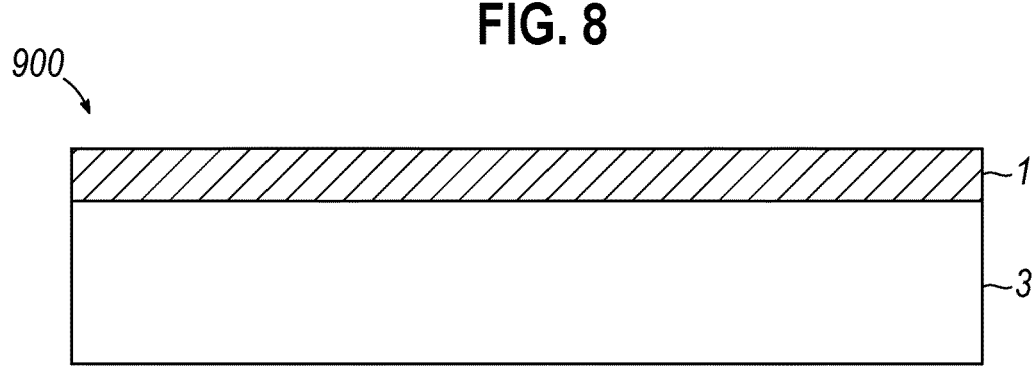
FIG. 9 is an article such as a cushion and/or mattress implementing the composite described herein.

FIG. 9 is an example of an article 900, such as a cushion and/or mattress. The base of the section is a prime foam layer 3. On top of this is a 3-inch layer of flexible cellular foam with highly thermally-conductive nanomaterials 1.

Figure 10:
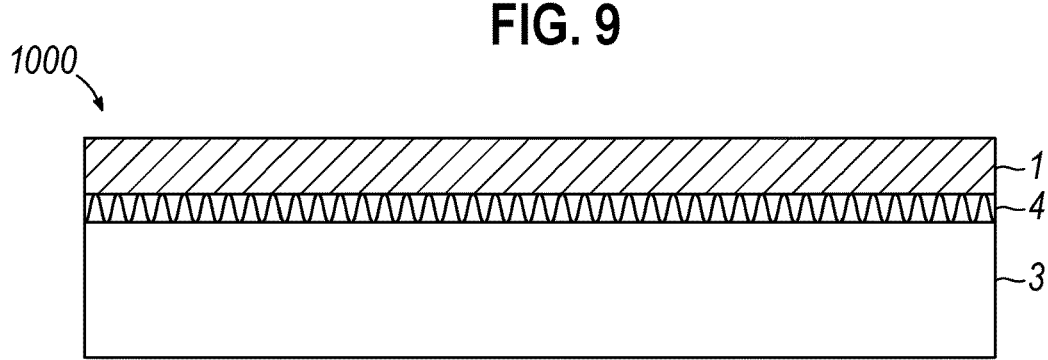
FIG. 10 is an article such as a cushion and/or mattress implementing the composite described herein.

FIG. 10 is an example of an article 1000, such as a cushion and/or mattress. The base of the section is a prime foam layer 3. On top of this is a 3-inch (7.6 cm) layer of flexible cellular foam with highly thermally-conductive nanomaterials 1. The interface 4 between the two layers is a non-planar convolution, which may be made by convoluting the surface of either or both interfacing layers, such as the flexible cellular foam with highly thermally-conductive nanomaterials 1 and the prime foam layer 3.

Figure 11:
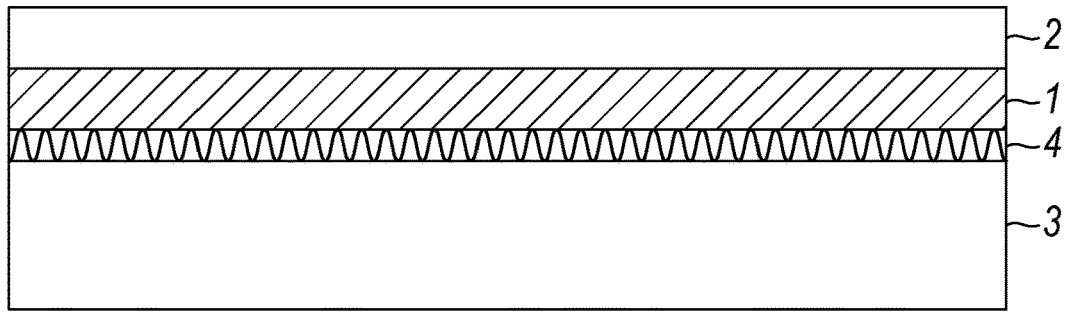
FIG. 11 is an article such as a cushion and/or mattress implementing the composite described herein.

FIG. 11 is an example of an article 1100, such as a cushion and/or mattress. The base of the section is a prime foam layer 3. On top of this is a 2-inch (5 cm) layer of flexible cellular foam with highly thermally-conductive nanomaterials 1. The interface 4 between the two layers is a non-planar convolution, which may be made by convoluting the surface of either or both interfacing layers, such as the flexible cellular foam with highly thermally-conductive nanomaterials 1 and the prime foam layer 3. The top of this example is a 2-inch (5 cm) layer 2 of standard, open-celled viscoelastic foam.

Figure 12:
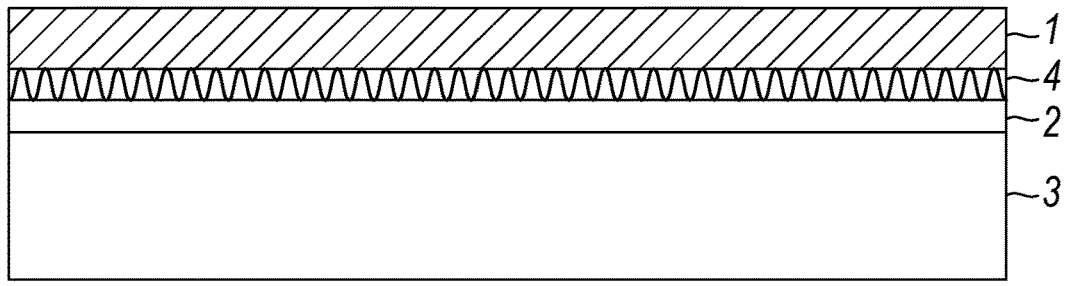
FIG. 12 is an article such as a cushion and/or mattress implementing the composite described herein.

FIG. 12 is an example of an article 1200, such as a cushion and/or mattress. The base of the section is a prime foam layer 3. Above this is a 2-inch (5 cm) layer 2 of standard, open-celled viscoelastic foam. On top of this is a 2-inch layer (5 cm) of flexible cellular foam with highly thermally-conductive nanomaterials 1. The interface 4 between the two layers is a non-planar convolution, which may be made by convoluting the surface of either or both interfacing layers such as the flexible cellular foam with highly thermally-conductive nanomaterials 1 and layer 2 of standard, open-celled viscoelastic foam.

Figure 13:
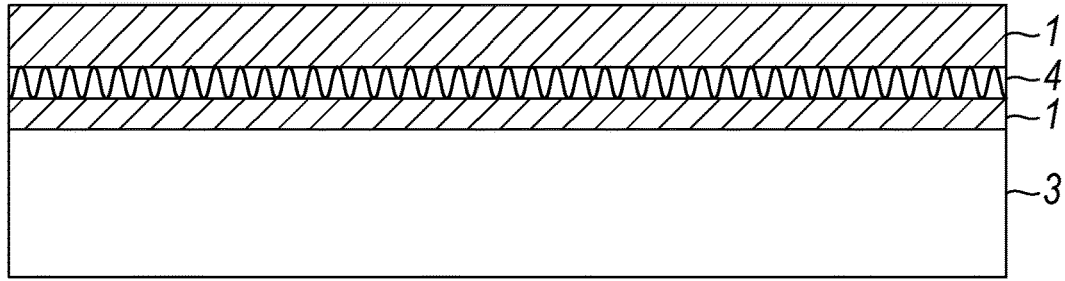
FIG. 13 is an example article such as a cushion and/or mattress implementing the composite described herein.

FIG. 13 is an example of an article 1300, such as a cushion and/or mattress. The base of the section is a prime foam layer 3. Above this is a 2-inch (5 cm) layer of flexible cellular foam with highly thermally-conductive nanomaterials 1. On top of this is another 2-inch (5 cm) layer of flexible cellular foam with highly thermally-conductive nanomaterials 1. The interface 4 between the two layers is a non-planar convolution, which may be made by convoluting the surface of either or both interfacing layers, such as the flexible cellular foams with highly thermally-conductive nanomaterials 1.

Figure 14:
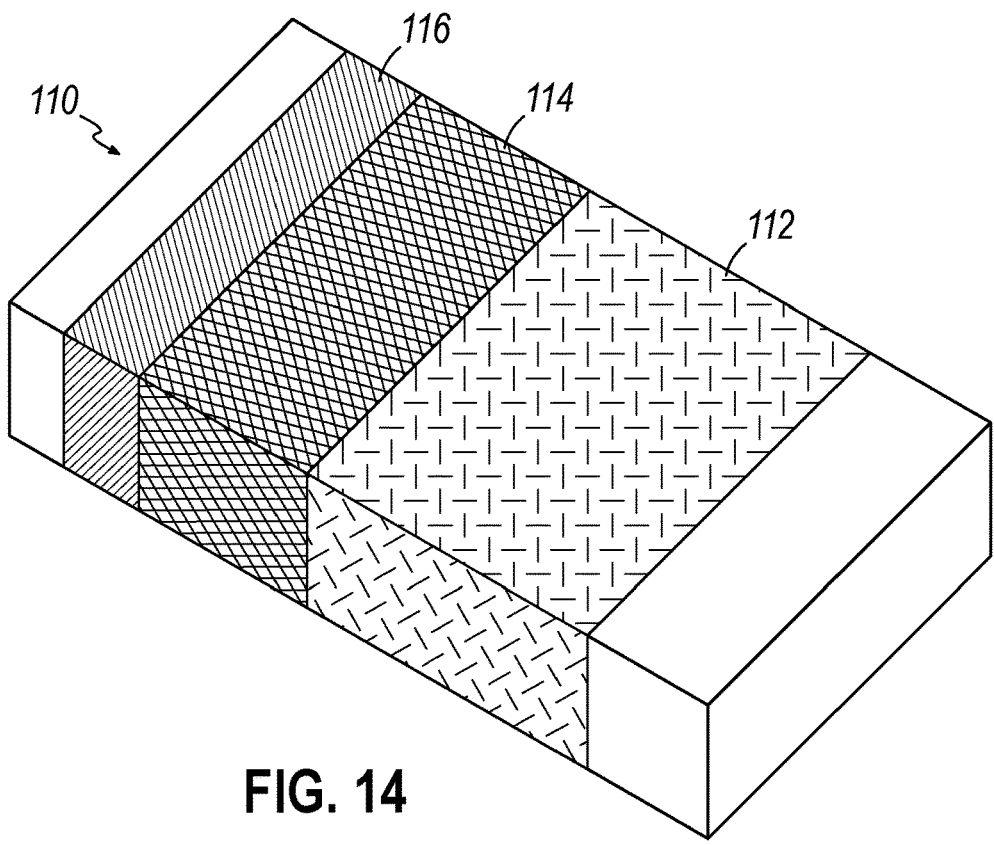
FIG. 14 shows an example breakdown of lateral mattress zones in a cushion and/or mattress application.

FIG. 14 is an example breakdown of lateral mattress zones or sections in a mattress 110. These zones include: lower body zone or section 112, torso/"belly band" zone or section 114, and head and shoulders zone or section 116. These zones or sections may or may not include flexible cellular foams with highly thermally-conductive nanomaterials, example constructions, other mattress layer constructions, or any variation thereof. Furthermore, the zones shown are not limiting, but used as an example to show the possibility of utilizing enhanced thermally dissipating layers in specific areas of cushions and/or a mattress.

Figure 15:
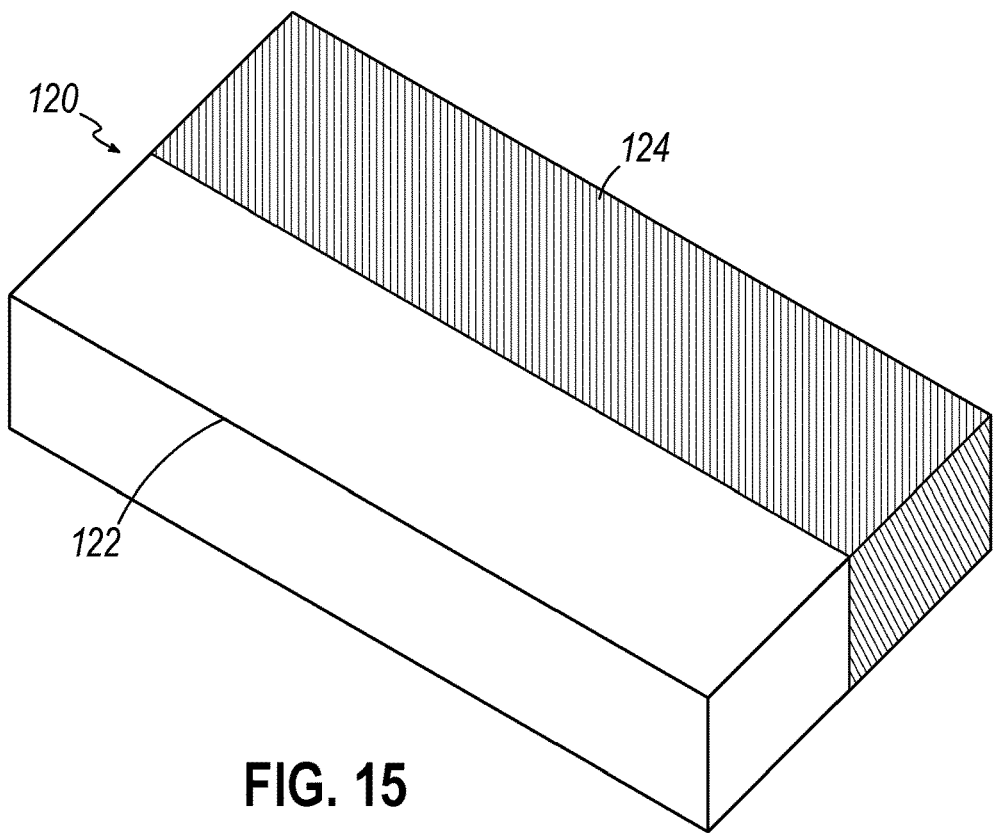
FIG. 15 shows an example breakdown of longitudinal mattress zones in a cushion and/or mattress application.

FIG. 15 is an example breakdown of longitudinal mattress zones 122 and 124 in a mattress 120. These zones include left section 122 and right section 124. These zones or sections 122 and 124 may or may not include flexible cellular foams with highly thermally-conductive nanomaterials, example constructions, other mattress layer constructions, or any variation thereof. Furthermore, the zones shown are not limiting, but used as an example to show the possibility of utilizing enhanced thermally dissipating layers in specific areas of cushions and/or a mattress.

Figure 16:
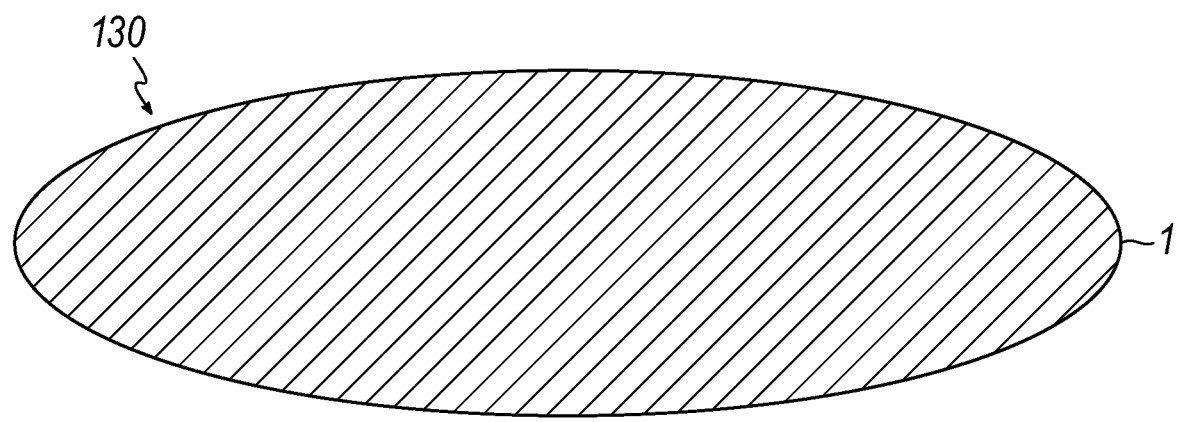
FIG. 16 is an example of a molded pillow product where the entire structure is molded from flexible cellular foam with highly thermally-conductive nanomaterials.
Figure 17:
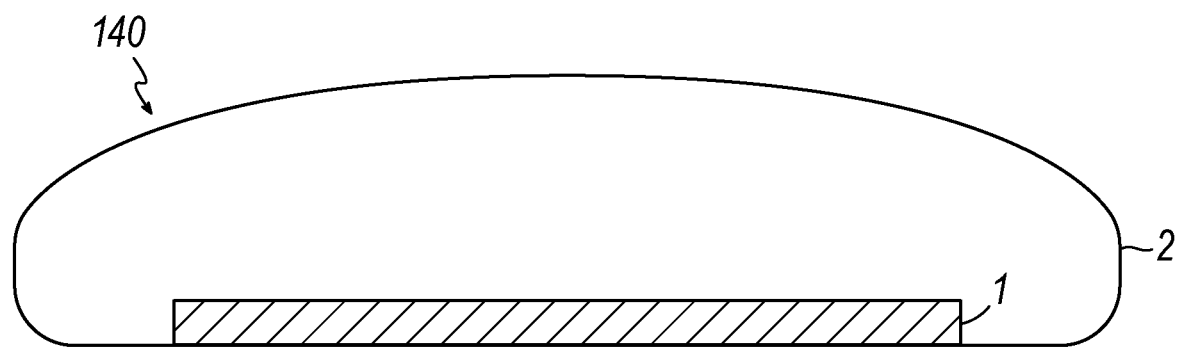
FIG. 17 is an example of a molded pillow product where the flexible cellular foams with highly thermally-conductive nanomaterials is a region or layer within the pillow.

FIGS. 16 and 17 are depictions of molded pillow systems. FIG. 16 is a pillow 130 molded entirely out of flexible cellular foam with highly thermally-conductive nanomaterials 1. FIG. 17 shows a pillow 140 using flexible cellular foam with highly thermally-conductive nanomaterials 1 as a region within the overall pillow structure 2.

As indicated above, there may also be provided a cellular foam comprising cross-linked latex foam and highly thermally-conductive nanomaterial (HTCN) particles, i.e. carbon nanomaterials, dispersed in the cross-linked latex foam. The HTCN particles may be added in an amount between about 0.0001% and about 30.0% by weight, inclusively, of final net weight of cured latex foam, and more preferably in an amount between about 0.0005% and about 10.0% by weight, inclusively, of final net weight of cured latex foam. Again, with reference to FIG. 4, one process used for open-celled, flexible latex foam production involves adding the HTCN particles 42 to the natural or synthetic latex liquid polymer directly into the tank 50, or mixed with a carrier 44, which may be a water-based latex carrier mixture, or, within a feed auger providing carrier 44 to the tank 50, followed by introducing air into the latex, e.g. whipping or beating warm natural or synthetic latex in the presence of additives to promote open cell formation, stabilization and curing. Additives may include, but not necessarily be limited to, foam stabilizers, foam promoters, zinc oxide delayed action gelling agents, antimicrobial agents, odor absorbing or masking additives, other performance enhancing additives and combinations thereof. A final step in this process is to cure the foam with heat. Suitable latex foam production processes known by those skilled in the art for latex foam manufacturing include, but are not necessarily limited to, molded and free-rise latex methods produced with the Dunlop or Talalay latex processes. In the Talalay latex process, the latex foam is cured by introducing carbon dioxide into the mold with latex. The carbon dioxide reacts with water forming carbonic acid, which lowers the pH and causes the latex to thicken and hold its cell structure and shape. The mold temperature is then raised to about 230° F. and held for a predetermined amount of time to crosslink or vulcanize the latex polymer. In the Dunlop process, the latex mixture is cured by addition of chemical additives such as sodium fluorosilicate, and later the latex is vulcanized or cross-linked by raising the temperature.

There may also be provided a cellular foam comprising cross-linked melamine foam and highly thermally conductive nanomaterial (HTCN) particles dispersed in the cross-linked melamine foam. The HTCN particles may be added in an amount between about 0.0001% and about 30% by weight, inclusively, of final net weight of cured melamine foam.

In one non-limiting example, there may be provided a flexible cellular foam with highly thermally-conductive nanomaterials that consists essentially of or consists of a flexible cellular foam, and highly thermally-conductive nanomaterial particles dispersed in the flexible cellular foam, where the highly thermally-conductive nanomaterial particles are selected from a group of carbon-containing nanomaterials. The carbon-containing nanomaterials include a group selected from carbon nanotubes selected from single-walled, double-walled, and multi-walled nanotubes, carbon-containing nanoplatelets, graphene nanoplatelets, and mixtures thereof.

While this detailed description has set forth particularly suitable embodiments of this invention, numerous modifications and variations of the structure of this invention, all within the scope of the invention, will readily occur to those skilled in the art. Accordingly, it is understood that this description is illustrative only of the principles of the invention and is not limitative thereof. Although specific features of the invention are shown in some of the drawings and not others, this is for convenience only, as each feature may be combined with any and all of the other features in accordance with this invention. Other embodiments may occur to those skilled in the art and are within the following claims.

The words "comprising" and "comprises" as used throughout the claims is interpreted "including but not limited to". The present invention may suitably comprise, consist or consist essentially of the elements disclosed and may be practiced in the absence of an element not disclosed. The invention as described above is meant to be illustrative and not limiting, and accordingly, the present invention is defined as provided in the appended claims.

What is claimed is:
1. A composite comprising:
a flexible cellular foam; and
a plurality of highly thermally-conductive nanomaterials dispersed in the flexible cellular foam, wherein the surface area of the highly thermally-conductive nanomaterials is between 3 square meters per gram of the highly thermally-conductive nanomaterials and less than 500 square meters per gram of the highly thermally-conductive nanomaterials, inclusively.

2. The composite of claim 1, wherein the highly thermally-conductive nanomaterials are selected from a group consisting of single-walled carbon nanotubes, double-walled carbon nanotubes, multi-walled carbon nanotubes, graphite nanoplatelets, graphene nanoplatelets, graphite oxide, graphene oxide, diamond nanoparticles, carbonado nanoparticles, carbon nanodots, carbon nanofibers, carbon nanotips, carbon nanowhiskers, and mixtures thereof.

3. The composite of claim 1, wherein the flexible cellular foam is produced by an in-situ process comprising polymerizing a polyol with a poly-isocyanate in the presence of the highly thermally-conductive nanomaterials.

4. The composite of claim 1, wherein the flexible cellular foam is selected from the group consisting of an open-celled polyether polyurethane foam, closed-celled polyether polyurethane foam, partially open-celled polyether polyurethane foam, open-celled polyester polyurethane foam, closed-cell polyester polyurethane foam, partially open-celled polyester polyurethane foam, and combinations thereof.

5. The composite of claim 1, wherein the composite comprises the highly-thermally conductive nanomaterials in an amount between about 0.0001% and about 30.0% by weight of the composite weight after gas loss.

6. The composite of claim 1, wherein the composite comprises the highly thermally-conductive nanomaterials in an amount between about 0.0005% and about 15.0% by weight of the composite weight after gas loss.

7. The composite of claim 1, wherein the composite comprises the highly thermally-conductive nanomaterials in an amount between about 0.0005% and about 2.0% by weight of the composite weight after gas loss.

8. The composite of claim 1, wherein the highly thermally-conductive nanomaterials are present in an amount of between 1 parts per million to 100 parts per million of the composite, inclusively.

9. The composite of claim 1, wherein the highly thermally-conductive nanomaterials have a length in any one dimension in the range from 1 to 1000 nanometers.

10. The composite of claim 1, wherein said highly thermally-conductive nanomaterials have a length in any one dimension between 1 nanometer and 500 nanometers, inclusively.

11. An article of manufacture comprising the composite of claim 1.

12. The composite of claim 1, wherein the highly thermally-conductive nanoparticles are homogeneously dispersed in the flexible cellular foam.

13. The composite of claim 1, wherein the highly thermally-conductive nanoparticles are non-homogeneously dispersed in the flexible cellular foam.

14. The composite of claim 1, wherein the highly thermally-conductive nanoparticles are dispersed in a swirl pattern in the flexible cellular foam.

15. An article of manufacture containing the composite of claim 1, wherein the article is selected from the group consisting of a cushion foam, a mattress, a mattress topper pad, and combinations thereof, the article of manufacture comprises at least one zone selected from the group consisting of a longitudinal zone, a lateral zone, and combinations thereof, and the at least one zone comprises the composite of claim 1.

16. An article of manufacture selected from the group consisting of medical cushioning foams, mattresses, pillows, bedding products, mattress pillow toppers, quilted mattress toppers, mattress toppers, pet beds, shoe soles, indoor cushioning foams, indoor furniture foams, outdoor cushioning foams, outdoor furniture foams, outdoor bedding pads, outdoor pillows, and combinations thereof, where the article of manufacture further comprises the composite of claim 1.

17. A composite comprising:
a flexible cellular foam; and
highly thermally-conductive nanomaterials dispersed in the flexible cellular foam, wherein said highly thermally-conductive nanomaterials are selected from the group consisting of natural flake graphite, powder graphite, graphene, synthetic graphite, graphite-based particulates, aluminum nitride, diamond, diamond crystal powder, natural diamond crystal powder, type IIa diamond powder, carbanado ("Black Diamond") nanoparticles, silicon carbide, boron nitride, carbon nanomaterials, and combinations thereof, wherein the surface area of the highly thermally-conductive nanomaterials is between 3 square meters per gram of the highly thermally-conductive nanomaterials and less than 500 square meters per gram of the highly thermally-conductive nanomaterials, inclusively.

18. A flexible cellular foam composite comprising:
a foam selected from the group containing a cross-linked latex foam, a cross-linked melamine foam, and a polyurethane foam; and
highly thermally-conductive nanomaterials dispersed in the foam, wherein the surface area of the highly thermally-conductive nanomaterials is between 3 square meters per gram of the highly thermally-conductive nanomaterials and less than 500 square meters per gram of the highly thermally-conductive nanomaterials, inclusively.

19. The flexible cellular foam composite of claim 17 wherein said highly thermally-conductive nanomaterials are selected from a group consisting of single-walled carbon nanotubes, double-walled carbon nanotubes, multi-walled carbon nanotubes, graphite nanoplatelets, graphene nanoplatelets, graphite oxide, graphene oxide, diamond nanoparticles, carbonado nanoparticles, carbon nanodots, carbon nanofibers, carbon nanotips, carbon nanowhiskers, and mixtures thereof.

20. A composite comprising:
a flexible cellular foam; and
highly thermally-conductive nanomaterials dispersed in the flexible cellular foam, wherein said highly thermally-conductive nanomaterials are selected from a group consisting of single-walled carbon nanotubes, double-walled carbon nanotubes, multi-walled carbon nanotubes, graphite nanoplatelets, graphene nanoplatelets, graphite oxide, graphene oxide, diamond nanoparticles, carbonado nanoparticles, carbon nanodots, carbon nanofibers, carbon nanotips, carbon nanowhiskers, and mixtures thereof, wherein the surface area of the highly thermally-conductive nanomaterials is between 3 square meters per gram of the highly thermally-conductive nanomaterials and less than 500 square meters per gram of the highly thermally-conductive nanomaterials, inclusively.

21. An article of manufacture made from the composite of claim 19.

22. A composite comprising:
a flexible cellular foam; and
a plurality of highly thermally-conductive non-metallic solids dispersed in the flexible cellular foam, said solids containing an aggregate surface area per gram of non-metallic solids ranging from 3 to less than 500 square meters.

23. The composite of claim 22, wherein said highly thermally-conductive non-metallic solids comprise solids selected from a group consisting of micro-sized graphite or graphene, exfoliated graphite, and carbon nanomaterials.

24. The composite of claim 22, wherein said highly thermally-conductive nanomaterials have a thermal conductivity between 10 W/mK and 10,000 W/mK.

25. The composite of claim 22, wherein said highly thermally-conductive non-metallic solids are homogeneously dispersed in the flexible cellular foam.

26. The composite of claim 22, wherein said highly thermally-conductive non-metallic solids are non-homogeneously dispersed in the flexible cellular foam.

27. The composite of claim 26, wherein the highly thermally-conductive non-metallic solids are dispersed in a swirl pattern in the flexible cellular foam.

28. An article of manufacture made from the composite of claim 22.

29. A composite comprising:
a flexible cellular foam; and
a plurality of highly thermally-conductive nanomaterials dispersed in the flexible cellular foam, the highly thermally-conductive nanomaterials comprise metallic nanoparticles, wherein the surface area of the highly thermally-conductive nanomaterials is between 3 square meters per gram of the highly thermally-conductive nanomaterials and less than 500 square meters per gram of the highly thermally-conductive nanomaterials, inclusively.

30. The composite of claim 29, wherein the highly thermally-conductive nanomaterials exclude silver and copper.

31. An article of manufacture made from the composite of claim 29.

* * * * *